RE 25557

March 8, 1960      R. H. HUDDLESTON, JR      2,928,038

ELECTROMAGNETIC WELL LOGGING SYSTEM

Filed Oct. 5, 1956

INVENTOR.
RICHARD H. HUDDLESTON, JR.,
BY James M. Peppers

AGENT.

United States Patent Office
2,928,038
Patented Mar. 8, 1960

2,928,038

ELECTROMAGNETIC WELL LOGGING SYSTEM

Richard H. Huddleston, Jr., Houston, Tex., assignor, by mesne assignments, to Welex, Inc., a corporation of Delaware Application October 5, 1956, Serial No. 614,194

11 Claims. (Cl. 324—1)

This invention generally relates to systems for logging the electrical conductivity of earth formations traversed by a well bore, and more particularly relates to an electromagnetic system for detecting and transmitting an indication of such conductivity.

Electromagnetic systems for logging well bore formations are widely known and have been used with particular success in the logging of well bores containing non-conductive fluids or no fluids at all.

Two general types of such systems have evolved from past development. One of such systems provides a single coil having a high frequency current impressed therethrough. The induction of such a coil then varies with the conductivity of the formation. Such induction variation is usually measured by detection of the input-output phase differences with a Maxwell bridge or of the frequency changes in an oscillating circuit.

The other of such types are the multiple coil systems providing one or more exciting coils and one or more receiver coils adapted to have voltages induced therein. Variation in such induced voltage is then indicative of the conductivity of the formation. While both of these systems have been successful to some extent, difficulties in detection and measuring have been encountered. In the single coil system, having the coil as one leg of a Maxwell bridge, it has been necessary to transmit individual signals from both legs of the bridge in order to determine the phase relation therebetween. Also, in the multiple coil systems, there have been difficulties in transmitting signals to the surface of the earth at the frequencies used in view of the mutual inductance and capacitance between the various conductors in the well logging cables.

It is therefore the general object of this invention to provide a new and novel system for detecting, measuring and transmitting the relative voltage induced in a coil by concurrently induced formation eddy currents.

In accordance with the present invention, an electromagnetic logging system adapted to traverse a well formation is provided, comprising, constant current electromagnetic means of inducing eddy currents in a well formation, induction means to produce a voltage in response to said eddy currents, means to detect only the voltage induced by said eddy currents and to vary a sub-carrier frequency, frequency modulated transmission means adapted to be modulated by said sub-carrier frequency, and receiving and indicating means to indicate variations of said modulated frequency.

For a more detailed explanation of the invention, and for further objects and advantages thereof, reference may now be had to the following description taken in conjunction with the drawing in which.

Figure 1:
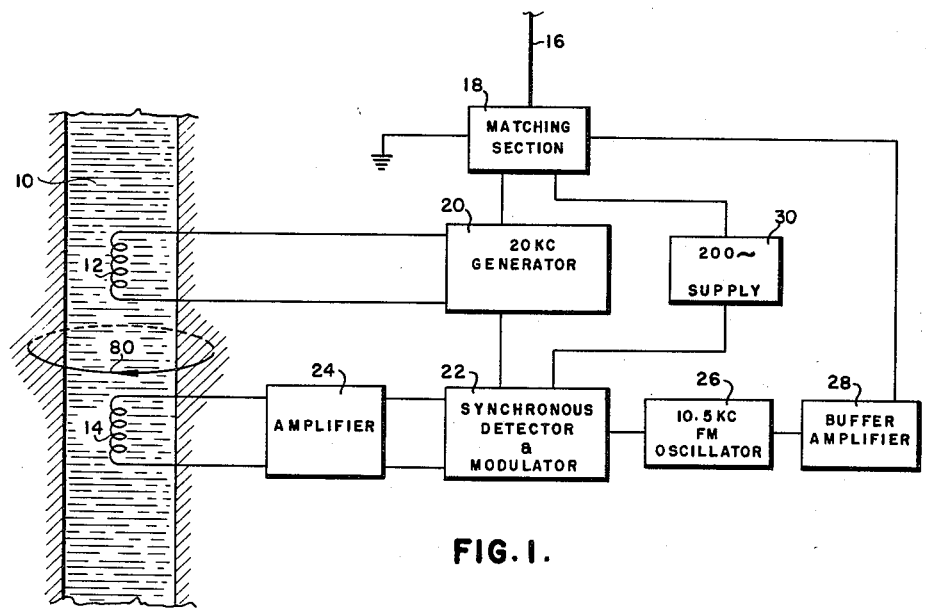
Figure 1 is a schematic view of an embodiment of the present invention.

Now referring to Figure 1, there is shown a well bore 10 having suspended therein, from a single conductor logging cable 16, an exciting coil 12 selectively spaced from a receiver coil 14. Connected to exciting coil 12 is a constant current exciting generator 20, herein exampled as having a frequency of 20 kilocycles. Receiver coil 14 is connected through an amplifier 24 into a phase sensitive synchronous detector and modulator 22. The output of detector and modulator 22 is connected into a frequency modulated oscillator 26, herein exampled as having a frequency of 10.5 kilocycles. The output of oscillator 26 is connected through a buffer amplifier 28, matching section 18, and cable 16 to discriminating and recording equipment (not shown) located at the surface of the earth. Also connected to cable 16 through matching section 18 is a reference voltage supply 30. The output of voltage supply 30 is connected into detector and modulator 22. Current generator 20 is also connected to cable 16 through matching section 18. Current generator 20 is connected into detector and modulator 22. Generator 20, as well as voltage supply 30, is herein exampled as receiving a power input of 400 cycles through cable 16. Said 400 cycle power is rectified as required to furnish a direct current source, such as that exampled by battery 68 in Figure 2.

As the surface equipment necessary to discriminate and indicate the output of FM oscillator 26 is well known and presently used, a description thereof has been herein omitted. Reference may be had to Pat. No. 2,573,133 to Greer for a clear description and illustration of such equipment.

Figure 2:
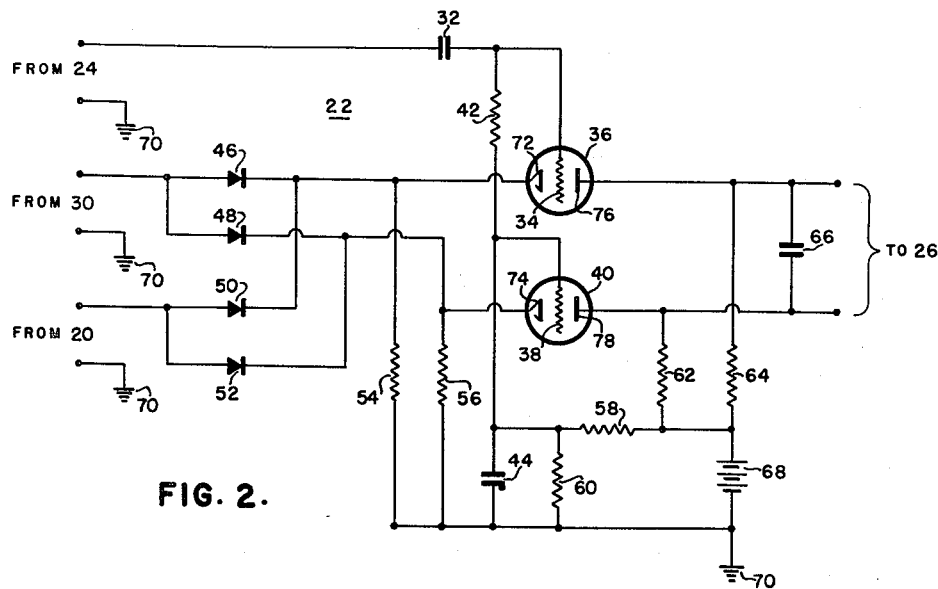
Figure 2 is a schematic embodiment of a novel circuit provided by this invention.

Now referring to Figure 2, there is shown in detail an embodiment of a phase sensitive synchronous detector and modulator 22 as provided by this invention. The output of amplifier 24 is connected through a capacitor 32 to a grid 34 of a triode vacuum tube 36 and through capacitor 32 and a resistor 42 to a grid 38 of a triode vacuum tube 40. Amplifier 24 output is also connected to ground through capacitor 32, resistance 42, and a capacitor 44. A direct current supply 68, herein exampled as a battery, is connected through a resistor 64 to plate 76 of triode 36 and through a resistor 62 to plate 78 of triode 40. Supply 68 is also connected through resistors 58 and 60 to ground. Grids 34 and 38 are connected to the junction of resistors 58 and 60. The cathode 72 of triode 36 is connected to ground through resistor 54. The cathode 74 of triode 40 is connected to ground through resistor 56. Plate 76 of triode 36 and plate 78 of triode 40 are connected across a capacitor 66. Reference voltage supply 30 is connected through a rectifier 46 to cathode 72, and through a rectifier 48 to cathode 74. Current generator 20 is connected through a rectifier 50 to cathode 72 and connected through a rectifier 52 to cathode 74.

As shown in Figure 2, triodes 36 and 40 of identical types are connected as balanced, degenerative amplifiers with the grids connected to the same direct current reference voltage at the junction of resistors 58 and 60, which function as a voltage divider across the direct current supply 68. Capacitor 44 is provided to bypass alternating current from amplifier 24 to ground. Resistor 42 is provided to create a high impedance input for alternating current on the grid 34 of triode 36. For balanced operation, plate resistors 62 and 64 are of equal value as are the cathode resistors 54 and 56. As herein exampled, said plate and cathode resistors are also of equal value, but proper circuit operation is not contingent on this relation. However, it is pointed out that optimum stability is obtained with this relation for amplifier gains of unity or less.

It is apparent that, with no alternating current voltages impressed in the circuit, the direct current voltage level from plate to ground of each of triodes 36 and 40 will be identical. The voltage potential between plates 76 and 78 will therefore be zero. It is also seen that if the plate currents of both triodes are cut off, as by some external means, the direct current voltage level from the plate to ground of each of said triodes will be equal to supply voltage 68. Again, the voltage difference between plates 76 and 78 will be zero.

As is known, an induced signal voltage received through amplifier 24 from receiver coil 14 is actually a composite signal. One component of said induced signal is directly induced by exciting coil 12 and has a phase relation of 90° to the current in said exciting coil. The other component of said induced signal is induced by the eddy currents in the formation surrounding receiver coil 14 and has a phase relation of 180° with the current in exciting coil 12. The general paths of such eddy currents are indicated at 80 in Figure 1. Since the variation of such eddy currents is indicative of the conductivity of the surrounding formation, it is clearly seen that the desired intelligence is that component of the received signal which is induced by the eddy current 80. It is further seen that the component directly induced by exciting coil 12 should be obviated.

Now, with this composite alternating current signal from amplifier 24 being impressed on grid 34, an alternating voltage will appear across plates 76 and 78 which will be integrated to zero potential by capacitor 66.

A reference voltage of the same frequency and phase relation as the current exciting coil 12 is introduced through rectifiers 50 and 52 to cathodes 72 and 74. This 20 kilocycle reference voltage, preferably provided in the form of a symmetrical square wave, cuts off triodes 36 and 40 during each positive half cycle of said reference voltage and allows said triodes to conduct during each negative half cycle of said reference voltage. It is thus seen that the negative half cycle of the in-phase component of the incoming signal will arrive at such time that triodes 36 and 40 are conducting and will create an increase in voltage on plate 76 in relation to plate 78. Under such conditions the potential exhibited between plates 76 and 78 will be a pulsating direct current voltage of 20 kilocycle frequency which will be integrated to a direct current voltage by capacitor 66.

If the 20 kilocycle reference voltage were to be 180° out-of-phase with the 20 kilocycle signal voltage, it is seen that the positive half cycle of such 180° out-of-phase component of the incoming signal will arrive at such time that triodes 36 and 40 are conducting and will create a decrease in voltage on plate 76 in relation to plate 78. It may thus be seen that the integrated direct current voltage exhibited between plates 76 and 78 will bear a definite polarity relation with the phase of the incoming signal. It is also obvious that incoming signals having phase relations other than 0°, 90°, 180°, 270°, to the reference voltage will also be detected, but the direct current output will be a function of the phase angle as well as of the amplitude of the incoming signal. The reference voltage as herein provided, however, is in-phase with that component of the signal voltage induced by eddy current 80.

The directly induced component of the signal from amplifier 24, which has a phase relation of 90° to the exciting current in coil 12 (and the reference voltage from generator 20), will swing from a maximum positive value to a maximum negative value during the interval in which triodes 36 and 40 are conducting. Thus, the voltage change due to this component and across plates 76 and 78, when integrated by capacitors 66, will average to zero and thus be eliminated.

It is now seen that, with a composite 20 kilocycle induced signal voltage received from amplifier 24 and an in-phase reference voltage supplied from generator 20, a direct current voltage will appear across capacitor 66 which will be direct proportion to the amplitude of the in-phase component of said induced signal.

As previously described, if the voltages of cathodes 72 and 74 are raised sufficiently, triodes 36 and 40 will be cut off even though an alternating current signal is received from amplifier 24. A low frequency reference voltage of the same frequency required to modulate oscillator 26 is now provided through rectifiers 46 and 48 from reference voltage supply 30. This reference voltage from reference voltage supply 30 is herein exampled as being 200 cycles and is preferably provided as a symmetrical square wave. The positive half cycle of this 200 cycle reference voltage is provided to cut off triodes 36 and 40 in the same manner as does the 20 kilocycle reference voltage. At which time triodes 36 and 40 are cut off in response to this 200 cycle reference voltage, plates 76 and 78 are of equal potential. During the negative half cycle of the 200 cycle reference voltage triodes 36 and 40 are controlled by the 20 kilocycle reference voltage, and the direct current voltage appearing across capacitor 66 at this time is proportional to the in-phase component of the induced signal, as previously described. Capacitor 66 and resistors 62 and 64 are provided of such values that the resulting time constant is long with respect to 20 kilocycles and negligibly short with respect to 200 cycles. It is obvious that capacitor 66 can be replaced by any other recognized wave filter which passes the modulating frequency (herein exampled at 200 cycles) and discriminates against the signal frequency (herein exampled at 20 kilocycles) without departing from the spirit of the invention.

An alternating voltage at 200 cycles is now found across the capacitor 66 which varies in amplitude in direct proportion with the in-phase component of the 20 kilocycle induced signal voltage. F.M. oscillator 26 is modulated by this 200 cycle voltage.

It is now clearly seen that with circuit 22 receiving a 20 kilocycle signal from amplifier 24, a 20 kilocycle reference voltage from current generator 20, and a 200 cycle reference voltage from voltage supply 30, a 200 cycle voltage will appear across capacitor 66 to modulate oscillator 26 in response to amplitude variation of only the component of said signal in-phase with said 20 kilocycle reference voltage.

It is also pointed out that the operation of this detection and modulating circuit 22 is not contingent on the low frequency reference voltage being 200 cycles. Such a frequency was herein selected as a preferred sub-carrier modulating frequency for F.M. oscillator 26.

It is now seen that the system herein described will transmit a frequency modulated signal to the earth's surface for subsequent discrimination and indication or recording which will be truly indicative of the conductivity of the well formation. Again pointed out is that exciting current generator 20 supplies a constant current to exciting coil 12. The electromagnetic field established by exciting coil 12 is thus also constant. The eddy currents induced by such field will therefore vary only in response to the conductivity of the adjacent formation. The secondary voltage induced in receiver coil 14, which is at 180° with respect to the current in exciting coil 12, will thus also vary with the variation in eddy current. This 180° component of the signal induced in coil 14, is then indicative of the formation conductivity. When detected and placed on a modulating sub-carrier frequency, a frequency modulated oscillator may then be modulated in response to such formation conductivity.

It is therefore seen that the system disclosed and illustrated herein provides a simple, accurate and reliable means to transmit signals over a single conductor cable which are truly indicative of the conductivity of earth formations traversed by the well bore.

It is also pointed out that this system could be combined with the herein referenced system disclosed in Pat. No. 2,573,133 to Greer. When so provided, other means of measuring formation characteristics could be combined with this system and give concurrent indication of such characteristics over a single conductor cable. It is also obvious that effects of variation and resistance of the cable to bending, stretching or changes in length will have no effect on indications of conductivity as herein detected.

The frequencies herein disclosed are not at all critical and could be varied extensively. It is pointed out however, that the ratio of the low frequency reference voltage to the exciting current frequency should be relatively low to give a well formed wave shape to the voltage modulating oscillator 26.

Other modifications and variations will be apparent to those skilled in this art, and all of such are considered to fall within the spirit and scope of this invention as defined in the appended claims.

That being claimed is:

1. An electromagnetic logging system having an exciting coil excited at a predetermined frequency and constant current, a separately spaced receiver coil adapted to have induced therein a composite voltage containing both directly induced and secondarily induced voltages, and a phase sensitive synchronous detector and modulator adapted to detect a particular phase component of said induced voltage and transform such phase component to a proportional voltage of a lower predetermined frequency for modulation of a frequency modulated transmission system, said phase sensitive synchronous detector and modulator including signal detection means to provide a direct current potential responsive to the amplitude variation of said phase component, and a low frequency switching means to convert said direct current potential to said low frequency modulating voltage.

2. The system of claim 1 wherein the phase sensitive combination synchronous detector and modulator comprises, a first degenerative amplifier balanced with a second degenerative amplifier, impedance means between the signal input of said first amplifier and said second amplifier adapted to provide a potential difference between the plate of said first amplifier and the plate of said second amplifier in proportion to the amplitude of an incoming signal, integrating means to integrate said potential difference, a rectified first frequency switching means having the same frequency as the incoming signal and adapted to switch on said amplifiers only during a selected phase of said incoming signal, and a rectified second frequency switching means to switch off said amplifiers during half the period of said low frequency whereby the potential across the plates of said first and second amplifier will be proportional to the amplitude of said selected phase of the incoming signal and of a frequency of said second frequency means.

3. An electromagnetic logging system having an exciting coil excited at a predetermined frequency and constant current, a separately spaced receiver coil adapted to have induced therein a composite voltage containing both directly induced and secondarily induced voltages, and a phase sensitive synchronous detector and modulator to detect said secondarily induced phase component of said induced voltage and transform such components to a proportional modulating voltage of a lower frequency for modulation of a frequency modulated transmission system, said phase sensitive synchronous detector and modulator including signal detection means adapted to provide a direct current potential responsive to the amplitude variation of said phase component and a low frequency switching means adapted to switch said detection means from said direct current potential to a zero potential to produce said low frequency modulating voltage.

4. The system of claim 3 wherein the phase sensitive combination synchronous detector and modulator comprises, a first amplifier balanced with a second amplifier, impedance means between the signal voltage input of said first amplifier and said second amplifier adapted to provide an alternating potential difference between the plate of said first amplifier and the plate of said second amplifier in proportion to the amplitude of a received signal, integrating means adapted to integrate said alternating potential difference into a direct current potential, a rectified first frequency switching means of the same frequency as said received signal adapted to switch on said amplifiers at a selected phase relation to said received signal during half the period of said first frequency, and a rectified second frequency switching means adapted to switch off said amplifiers during half the period of said second frequency whereby said direct current potential across the plates of said amplifiers will be proportional to the amplitude of said selected phase component of said incoming signal and will alternate from a zero potential to said direct current potential at said second frequency.

5. The system of claim 3 wherein the phase sensitive combination synchronous detector and modulator comprises, a first amplifier balanced with a second amplifier, impedance means between the signal voltage input of said first amplifier and said second amplifier adapted to provide an alternating potential difference between the plate of said first amplifier and the plate of said second amplifier in proportion to the amplitude of a received signal, integrating means adapted to integrate said alternating potential difference into a direct sum, a rectified first frequency switching means of the same frequency as said received signal adapted to switch on said amplifiers at a selected phase relation to said received signal during half the period of said first frequency, and a rectified second frequency switching means adapted to switch off said amplifiers during half the period of said second frequency whereby said potential sum across the plates of said amplifiers will be proportional to the amplitude of said selected phase component of said incoming signal and will alternate from a zero potential to said potential sum at said second frequency.

6. In an electromagnetic logging system having an exciter coil excited at a predetermined frequency and constant current, a separately spaced receiver coil adapted to have a voltage induced therein, and a phase sensitive synchronous detector and modulator to detect a particular phase component of said induced voltage and transform such component to a proportional modulated voltage of a lower predetermined frequency for modulation of a frequency modulated transmission system, said phase sensitive synchronous detector and modulator comprising, signal detection means adapted to provide a direct current potential responsive to the amplitude variation of said phase component, a low frequency switching means adapted to switch said detection means from said direct current potential to a zero potential at said low frequency, and a frequency modulated signalling means adapted to be modulated by the alternating potential provided by said low frequency switching means.

7. A phase sensitive combination synchronous detector and modulator comprising, a first amplifier balanced with a second amplifier, impedance means between the signal voltage input of said first amplifier and said second amplifier adapted to provide an alternating potential difference between the plate of said first amplifier and the plate of said second amplifier in proportion to the amplitude of a received signal, integrating means adapted to integrate said alternating potential difference into a direct current potential, a rectified first frequency switching means of the same frequency as said received signal adapted to switch on said amplifiers at a preselected phase relation to said received signal during half the period of said first frequency, and a rectified second frequency switching means adapted to switch off said amplifiers during half the period of said second frequency whereby said direct current potential across the plates of said amplifiers will be proportional to the amplitude of said selective phase component of said incoming signal and will alternate from a zero potential to said direct current potential at said second frequency.

8. A phase sensitive combination synchronous detector and modulator comprising, a first amplifier balanced with a second amplifier, impedance means between the signal voltage input of said first amplifier and said second amplifier adapted to provide an alternating potential difference between the plate of said first amplifier and the plate of said second amplifier in proportion to the amplitude of a received signal, integrating means adapted to integrate said alternating potential difference into a direct sum, a rectified first frequency switching means of the same frequency as said received signal adapted to switch on said amplifiers at a selected phase relation to said received signal during half the period of said first frequency, and a rectified second frequency switching means adapted to switch off said amplifiers during half the period of said second frequency whereby said potential sum across the plates of said amplifiers will be proportional to the amplitude of said selected phase component of said incoming signal and will alternate from a zero potential to said potential sum at said second frequency.

9. A phase sensitive synchronous detector comprising, a first amplifier balanced with a second amplifier, impedance means between the signal voltage input of said first amplifier and said second amplifier adapted to provide an alternating potential difference between the plate of said first amplifier and the plate of said second amplifier in proportion to the amplitude of a received signal, integrating means adapted to integrate said alternating potential difference into a direct current potential signal, a first frequency switching means of the same frequency as said received signal adapted to switch on said amplifiers at a preselected phase relation to said received signal during half the period of said first frequency whereby said direct current potential signal across the plates of said amplifiers will be proportional to the amplitude of a selective phase component of said received signal.

10. A phase sensitive synchronous detector comprising, a first amplifier balanced with a second amplifier, impedance means between the signal voltage input of said first amplifier and said second amplifier adapted to provide an alternating potential difference between the plate of said first amplifier and the plate of said second amplifier in proportion to the amplitude of a received signal, integrating means adapted to integrate said alternating potential difference into a direct current potential signal, a rectified first frequency switching means of the same frequency as said received signal adapted to switch on said amplifiers at a preselected phase relation to said received signal during half the period of said first frequency whereby said direct current potential across the plates of said amplifiers will be proportional to the amplitude of a selective phase component of said received signal.

11. A phase sensitive synchronous detector comprising, a first degenerative amplifier balanced with a second degenerative amplifier, impedance means between the signal voltage input of said first amplifier and said second amplifier adapted to provide an alternating potential difference between the plate of said first amplifier and the plate of said second amplifier in proportion to the amplitude of a received signal, integrating means adapted to integrate said alternating potential difference into a direct current potential signal, a first frequency switching means of the same frequency as said received signal adapted to switch on said amplifiers at a preselected phase relation to said received signal during half the period of said first frequency whereby said direct current potential signal across the plates of said amplifiers will be proportional to the amplitude of a selective phase component of said received signal.

References Cited in the file of this patent

UNITED STATES PATENTS

| | | |
|---|---|---|
| 2,489,920 | Michel | Nov. 29, 1949 |
| 2,568,137 | Adler | Sept. 18, 1951 |
| 2,723,375 | Schuster | Nov. 8, 1955 |
| 2,725,523 | Doll | Nov. 29, 1955 |
| 2,773,182 | Poldervaart | Dec. 4, 1956 |